W. K. HOWE.
ELECTRIC MOTOR.
APPLICATION FILED AUG. 8, 1911.
1,094,389.
Patented Apr. 21, 1914.
2 SHEETS—SHEET 1.
FIG. I
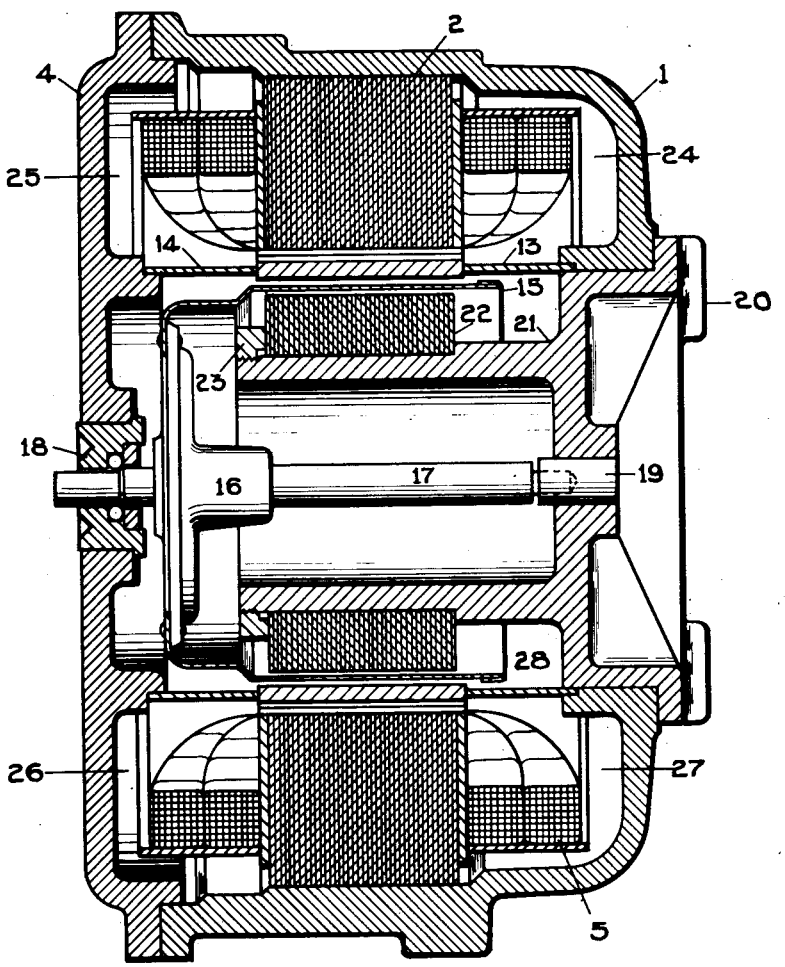

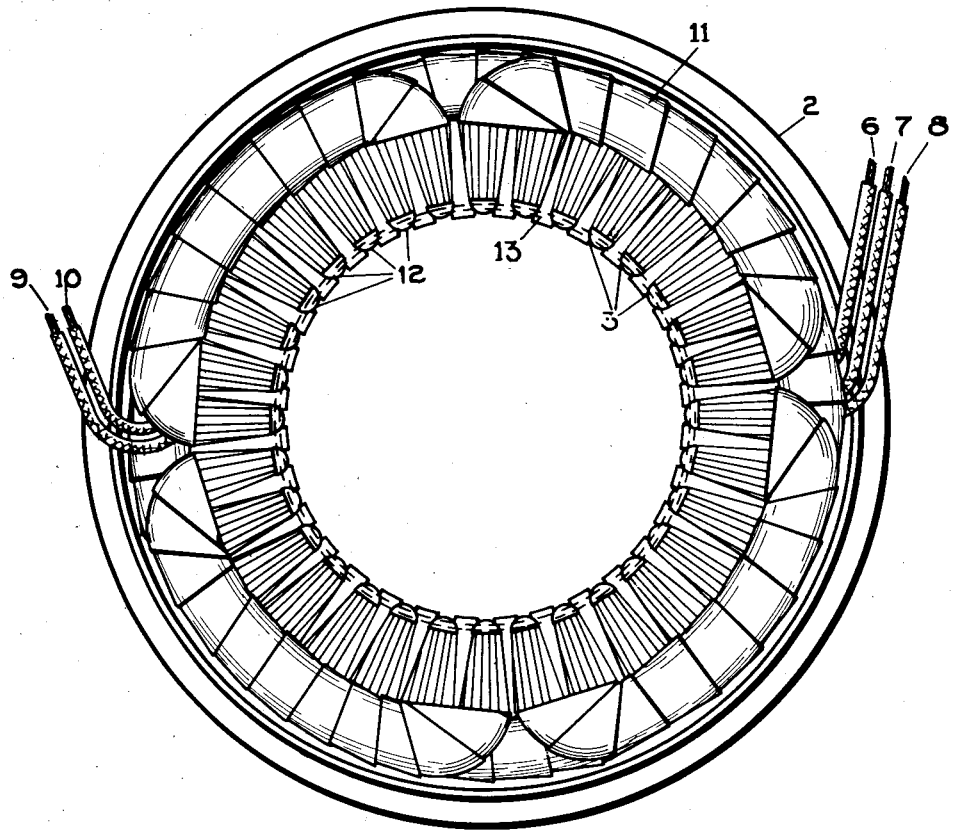
FIG. II

UNITED STATES PATENT OFFICE.

WINTHROP K. HOWE, OF ROCHESTER, NEW YORK, ASSIGNOR TO GENERAL RAILWAY SIGNAL COMPANY, OF GATES, NEW YORK, A CORPORATION OF NEW YORK.

ELECTRIC MOTOR.

1,094,389.  Specification of Letters Patent.  Patented Apr. 21, 1914.

Application filed August 8, 1911. Serial No. 643,042.

*To all whom it may concern:*

Be it known that I, WINTHROP K. HOWE, a citizen of the United States, and resident of the city of Rochester, in the county of Monroe and State of New York, have invented a new and useful Electric Motor, of which the following is a specification.

This invention relates to an electric motor and more particularly to the construction of the parts surrounding the rotating element commonly called the rotor or armature.

The object of the invention is to so construct and arrange the structural elements of an electric motor, that no loose material may interfere with the proper rotation of the rotor or armature, whether such loose material comes from sources outside of the motor itself or from the destruction or breaking away of parts of the motor other than the rotor or armature.

In electric motors it is highly desirable to prevent the possibility of any foreign material lodging between the rotor and the stator. This is especially so in the case of motors employing the shell type rotor, and more especially so in the case of the very small motors used as an operative means for circuit breakers, such as signaling relays. On account of the light construction of the rotor and the extremely small turning torque produced in it, a foreign substance between the shell and the stator might either cause a bending or tearing of the shell or result in a total stoppage of the motor when current was applied to cause it to rotate. Another difficulty still more serious would be to hold the shell in its moved position after the flow of current had ceased. Such an act would cause the contacts of the relay to remain closed when they should be open, consequently the signal controlled thereby would remain in the clear position when it should go to the danger position.

In describing the invention in detail reference will be had to the figures of the accompanying sheets of drawing and to the characters of reference marked thereon, of which like characters designate like parts, and in which:

Figure 1 is a sectional elevation of a motor of the shell type with my invention applied thereto; Fig. 2 is a side elevation of the stator member with part of my invention indicated thereon in dotted lines.

Numeral 1 designates an iron shell or casing, open at both ends; 2, as clearly shown in Fig. 2, designates an annulus and as shown in Fig. 1, is laminated in the well known manner of the fields of electric motors, there being slots 3 extending transversely of the annulus and opening on the inner bounding face of the annulus. The case 1 being entirely open at one end allows the annulus to be slid into its proper place into the case, as shown in Fig. 1. The open end of the case is then closed by a cap as 4, which may be fastened to the case in any approved manner. The annulus or stator has upon it the well known coils 5, the leads of which as shown in Fig. 2, are designated by 6, 7, 8, 9 and 10, which leads are connected to the source of propulsion current in the well known and approved manner. These coils, during the course of construction, are taped as designated by 11, in Fig. 2, and after being entirely formed, are thoroughly impregnated with some insulating compound in a manner well known and understood. In each of the slots 3, a wooden strip 12 is placed, which not only prevents the coils from becoming dislodged, but also prevents any loose material in the part of the coils in the slots from falling into the inner space bounded by the annulus, and on each side of the annulus is placed an annulus of some non-magnetic material, preferably brass, as designated by 13 and 14, Fig. 1. This annulus of brass bears on one side against the annulus 2 and on the other side in the case of 13, against the case 1 proper; and in the case of 14, bears against a shoulder on the cap 4 and thus prevents any loose material which may be in the coil chambers from getting out.

The rotor consists of a shell 15 shown in Fig. 1, which is attached to a spider 16, which has a shaft 17 passing therethrough, which is journaled in a roller bearing 18 inserted in the cap 4 and also has an agate bearing 19 supporting its other end, which agate bearing is borne by a cap 20 which just fits the open space in one side of the case and which may be fastened to the case after being put in place in any approved manner. The cap 20 has an inwardly projecting member 21, which bears upon its outer face the annulus 22, which is laminated in the same manner as the stator and is held in place upon the inwardly projecting member 21 by means of the collar 23, which is screw threaded upon the inwardly projecting member 21. The annulus 22 forms a means for decreasing the reluctance of the magnetic path between diametrically opposite poles of the stator.

It must be readily seen that the form of construction herein shown and described absolutely prevents any loose material which may be thrown off from the coils 5 of the stator in the chambers 24, 25, 26 and 27 from falling into the chamber 28 in which the shell rotor 15 is placed, and that the cap 4 and the cap 20 absolutely prevent any of the foreign material from outside sources from entering the chamber 28, so that at the time the device is assembled, the chamber 28 can be thoroughly cleaned out by blowing or other means and that after the cap 20 is put in place, complete assurance is had that nothing may thereafter enter the chamber 28 to interfere with the rotation of the rotor 15.

As the rotor 15 is of the shell type and of extremely light construction, and consequently would not require an excessive amount of force to bend or tear it, it is essential for successful operation that it be well guarded, as the gap in which it revolves between stator 2 and member 22 must be made as small as possible in order to attain maximum efficiency.

Although applicant has herein shown and described his invention by a particular physical embodiment in which a shell rotor is used, it is to be understood that applicant's invention is not limited to motors employing a shell rotor, for it is equally applicable and as valuable in motors employing any type of rotor, such for instance as the ordinary and well known wire wound rotor.

Having thus described the principle of my invention and described a particular specific embodiment thereof, what I claim as new and desire to secure by Letters Patent, is:

1. In an electric motor, a shell rotor, a stator, means for forming a dust proof chamber for the rotor, comprising the inner face of the stator, having slots therein closed by strips of non-magnetic material, non-magnetic members bearing on either side of the stator and a casing bearing against the other sides of the non-magnetic members, said casing having a removable portion allowing access to said chamber, and a body of magnetic material within said rotor supported by said removable portion of said casing.

2. In an electric motor, a shell rotor, a stator, means for forming dust proof chamber for the rotor, comprising the inner face of the stator, having slots therein closed by strips of non-magnetic material, non-magnetic members bearing on either side of the stator and a casing bearing against the other sides of the non-magnetic members, said casing having a removable portion allowing access to said chamber.

3. In an electric motor, a casing, a stator therein, a shell rotor adapted to revolve within said stator, and a body of magnetic material within said rotor, supported by a removable portion of said casing, forming part of the outside wall thereof, and a bearing for said rotor in said removable portion of said casing.

4. In an electric motor, a casing formed with a removable portion, a stator therein, a shell rotor adapted to revolve within said stator, a body of magnetic material within said rotor supported by the removable portion of said casing.

WINTHROP K. HOWE.

Witnesses:
  LILLIAN L. PHILLIPS,
  MARY G. DALBEY.